(12) United States Patent
Clarambeau

(10) Patent No.: US 9,301,511 B1
(45) Date of Patent: Apr. 5, 2016

(54) FISHING RIG WITH FLOATATION DEVICE

(71) Applicant: Harold Edward Clarambeau, Ft. Pierre, SD (US)

(72) Inventor: Harold Edward Clarambeau, Ft. Pierre, SD (US)

( * ) Notice: Subject to any disclaimer, the term of this patent is extended or adjusted under 35 U.S.C. 154(b) by 0 days.

(21) Appl. No.: 14/867,709

(22) Filed: Sep. 28, 2015

Related U.S. Application Data

(60) Provisional application No. 62/157,072, filed on May 5, 2015.

(51) Int. Cl.
*A01K 91/00* (2006.01)
*A01K 85/00* (2006.01)

(52) U.S. Cl.
CPC .............. *A01K 85/00* (2013.01); *A01K 2227/40* (2013.01)

(58) Field of Classification Search
USPC ................. 43/43.1, 42.7, 43.14, 42.22, 4, 4.5
See application file for complete search history.

(56) References Cited

U.S. PATENT DOCUMENTS

| | | | |
|---|---|---|---|
| 661,869 A | 11/1900 | Henkenius | |
| 1,093,980 A | 4/1914 | Donaly | |
| 1,316,040 A | 9/1919 | Jamison | |
| 1,792,989 A * | 2/1931 | La Gue | A01K 93/00 43/17 |
| 1,842,751 A | 1/1932 | Hannon | |
| 2,157,819 A * | 5/1939 | Eckert | A01K 93/00 43/43.15 |
| 2,306,692 A * | 12/1942 | Flood | A01K 85/16 43/42.21 |
| 2,448,523 A | 9/1948 | Fibiger | |
| 2,741,864 A | 4/1956 | Shotton | |
| 3,344,548 A | 10/1967 | Kurlovich | |
| 3,359,114 A | 12/1967 | Witteman | |
| 3,372,508 A | 3/1968 | Maglinger | |
| 3,387,402 A * | 6/1968 | Mays | A01K 83/06 43/41 |
| 3,803,747 A | 4/1974 | Cartwright | |
| 3,869,821 A | 3/1975 | McGahee | |
| 3,947,990 A | 4/1976 | Johnson | |
| 4,010,568 A | 3/1977 | Mays | |
| 4,052,809 A | 10/1977 | Reinhardt | |
| 4,075,777 A | 2/1978 | Dalton | |
| 4,137,664 A * | 2/1979 | Beres | A01K 95/00 43/43.1 |
| 4,228,611 A | 10/1980 | McGahee | |
| 4,314,420 A * | 2/1982 | Dickinson | A01K 95/00 43/42.39 |
| 4,928,422 A | 5/1990 | Pitre | |
| 5,027,544 A * | 7/1991 | Schlaegel | A01K 83/06 43/44.6 |
| D337,147 S | 7/1993 | Tomaszewski | |
| 5,303,497 A | 4/1994 | Rabideau | |
| 5,428,921 A | 7/1995 | Lancieri | |
| 5,647,163 A | 7/1997 | Gorney | |
| 6,237,276 B1 * | 5/2001 | Storelli | A01K 91/06 43/43.1 |
| 6,578,313 B1 | 6/2003 | Knol | |
| 6,675,525 B1 | 1/2004 | Ford | |
| 6,925,747 B1 | 8/2005 | Swanson | |
| 7,059,080 B2 * | 6/2006 | Bendel | A01K 85/18 43/42.11 |

(Continued)

*Primary Examiner* — Christopher P Ellis
(74) *Attorney, Agent, or Firm* — Jeffrey A. Proehl; Woods, Fuller, Shultz & Smith, P.C.

(57) ABSTRACT

A fishing rig for positioning an item of bait off of the bottom of body of water comprises a leader line having an inboard end and an outboard end and a terminal hook for attaching to one end portion of the bait, with the terminal hook being mounted on the leader line toward the outboard end. The rig may further comprise an adjustable hook for attaching to an opposite end portion of the bait, and the adjustable hook may be attached to the leader line between the inboard and outboard ends, and a position of the adjustable hook on the leader line may be adjustable. The rig may also comprise a buoyant float for floating a connected bait off of the bottom of the body of water, and the float may be connected to the leader line between the terminal and adjustable hooks.

15 Claims, 2 Drawing Sheets

(56) References Cited

U.S. PATENT DOCUMENTS

| | | | |
|---|---|---|---|
| 7,434,349 B2* | 10/2008 | Bennis | A01K 93/00 43/43.1 |
| 7,469,497 B2* | 12/2008 | Hergott | A01K 85/00 43/42.1 |
| 7,497,045 B1* | 3/2009 | Crowe | A01K 85/00 43/42 |
| 7,497,046 B1 | 3/2009 | Jefferson | |
| 7,841,129 B2 | 11/2010 | Blackshear, Jr. | |
| 8,024,887 B2* | 9/2011 | Milanowski | A01K 83/06 43/42.2 |
| 8,091,271 B2 | 1/2012 | Mayer | |
| 8,484,885 B2 | 7/2013 | Sheikh | |
| 8,713,848 B2* | 5/2014 | Huppert | A01K 91/053 43/42.09 |
| 8,745,916 B1* | 6/2014 | Rutty | A01K 85/01 43/42.06 |
| 8,832,991 B1 | 9/2014 | Dunbar | |
| 2002/0152671 A1 | 10/2002 | Downey | |
| 2003/0233783 A1 | 12/2003 | Storelli | |
| 2004/0020102 A1 | 2/2004 | Cramsey | |
| 2004/0049969 A1 | 3/2004 | Rudolph | |
| 2004/0200125 A1 | 10/2004 | Albanito | |
| 2006/0096156 A1 | 5/2006 | Griffero | |
| 2009/0107027 A1 | 4/2009 | Partridge | |
| 2010/0050497 A1 | 3/2010 | Brown | |
| 2010/0293833 A1 | 11/2010 | Bossone, III | |

* cited by examiner

FISHING RIG WITH FLOATATION DEVICE

REFERENCE TO RELATED APPLICATIONS

This application claims the benefit of U.S. provisional patent application No. 62/157,072 filed May 5, 2015 which is hereby incorporated by reference in its entirety.

BACKGROUND

Field

The present disclosure relates to fishing rig and more particularly pertains to a new fishing rig with floatation device for supporting an item of bait in a position off of the bottom of a body of water.

SUMMARY

In one aspect, the present disclosure relates to a fishing rig for attaching to and positioning an item of bait off of the bottom of body of water. The rig may comprise a leader line having an inboard end and an outboard end, and a terminal hook for attaching to one end portion of the item of bait with the terminal hook being mounted on the leader line toward the outboard end. The rig may also include an adjustable hook for attaching to an opposite end portion of the item of bait such that the item of bait is held along a portion of the leader line, with the adjustable hook being attached to the leader line between the inboard and outboard ends and a position of the adjustable hook on the leader line being adjustable. The rig may also include a buoyant float for floating a connected item of bait off of the bottom of the body of water, with the float being connected to the leader line between the terminal hook and the adjustable hook.

In another aspect, the disclosure relates to a fishing rig for attaching to and positioning an item of bait off of the bottom of body of water. The rig may comprise a leader line having an inboard end and an outboard end, and a terminal hook for attaching to one end portion of the item of bait, the terminal hook being mounted on the leader line toward the outboard end. The rig may include an adjustable hook for attaching to an opposite end portion of the item of bait such that the item of bait is held along a portion of the leader line. The adjustable hook may be attached to the leader line between the inboard and outboard ends, with a position of the adjustable hook on the leader line being adjustable and the adjustable hook being slidable along at least a portion of a length of the leader line. The rig may include a buoyant float for floating a connected item of bait off of the bottom of the body of water, with the float being connected to the leader line between the terminal hook and the adjustable hook and a position of the float on the leader wire is adjustable. The rig may also include a weight for moving the inboard end of the leader line toward the bottom of the body of water, with the weight being connected to the leader line towards the inboard end of the leader line and the weight may be mounted on the leader line or on a fishing line connected to the inboard end of the leader line.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as any particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
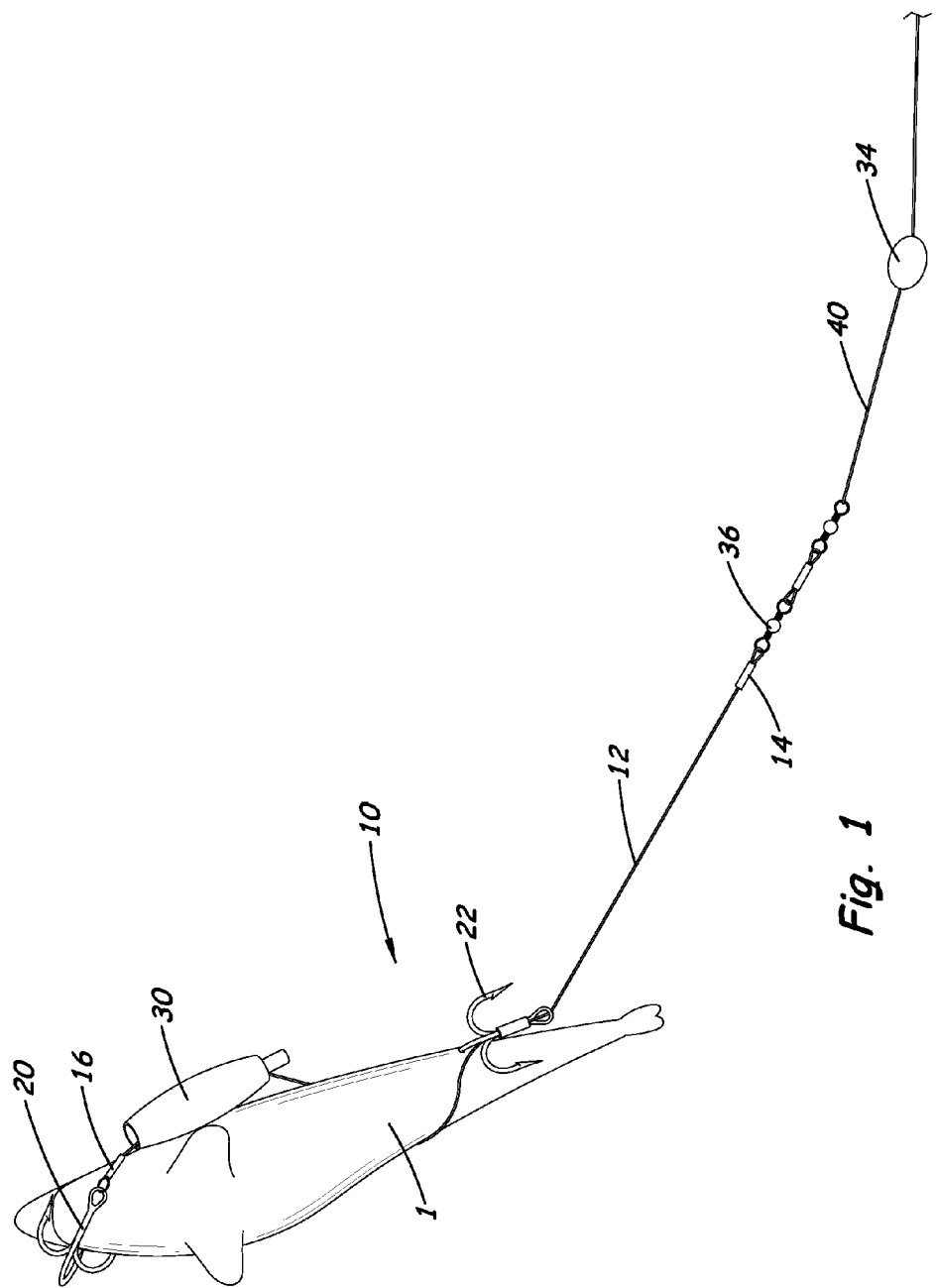
FIG. 1 is a schematic side view of a new fishing rig with floatation device in illustrative usage with an item of bait and weight, according to the present disclosure.
Figure 2:
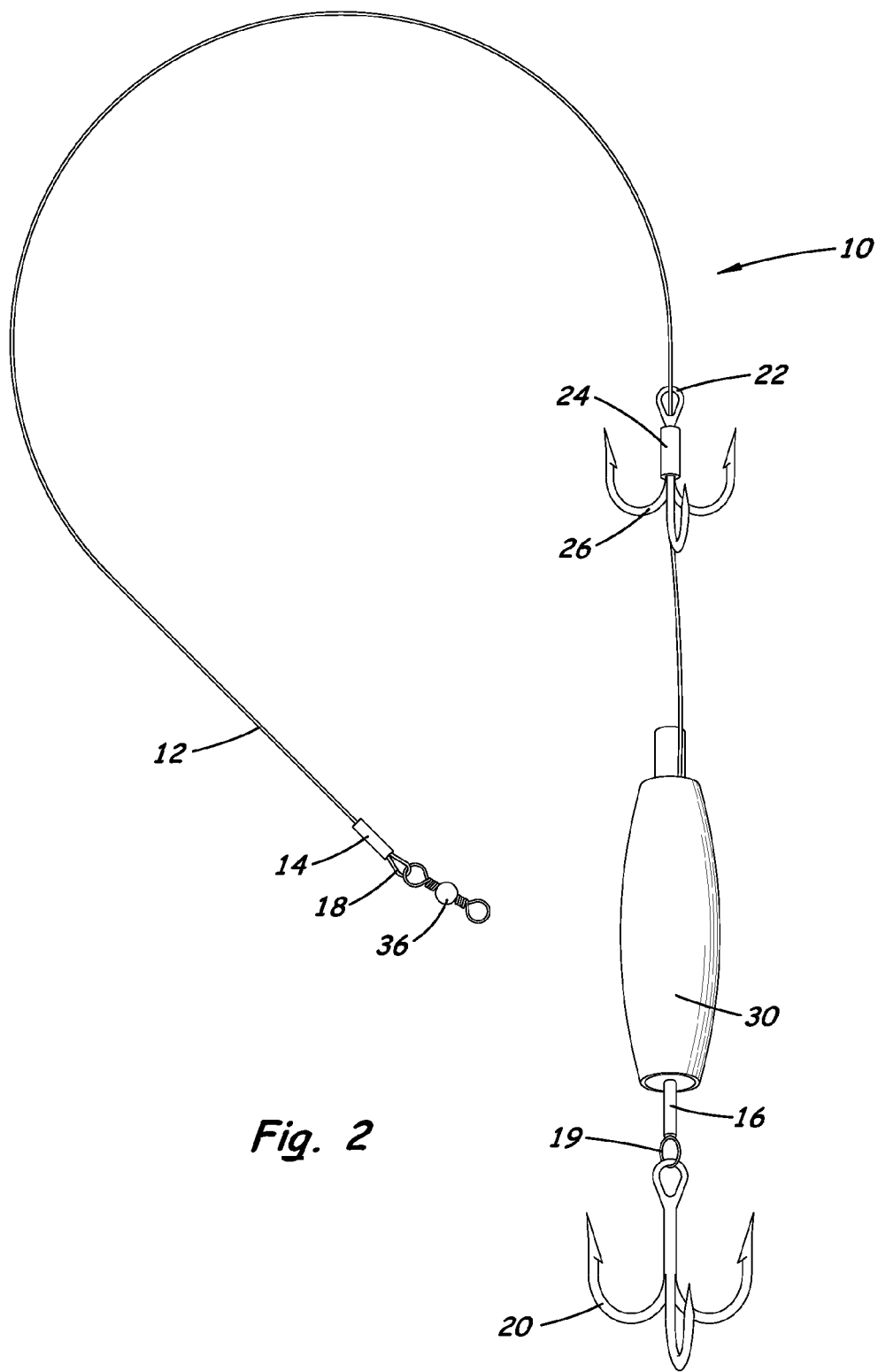
FIG. 2 is a schematic top view of an embodiment of the fishing rig, according to an illustrative embodiment.

With reference now to the drawings, and in particular to FIGS. 1 through 2 thereof, a new fishing rig with floatation device embodying the principles and concepts of the disclosed subject matter will be described.

The applicant has recognized that one drawback of some fishing rigs is that the bait is left to lie on the bottom or floor of the body water, which does not present a very visible attractant to the fish in the water. Attempts to lift the bait off of the bottom of the bottom by trying to stuff closed-cell extruded polystyrene foam (e.g., STYROFOAM) into the mouth of the bait fish is often difficult to perform and ineffective to get enough foam into the fish to actually raise the bait off of the bottom. The applicant has devices a rig that does not require such manipulation of the bait and effectively raises the bait off of the bottom of the body of water.

In some aspects, the disclosure relates to a fishing rig 10 suitable for attaching to an item of bait 1 for supporting and positioning the item of bait off of the bottom of a body of water, such as shown in FIG. 1 of the drawings. The rig 10 is able to hold the bait relatively close to the bottom of the body of water but still hold the bait off of the bottom. The rig 10 may include a leader line 12 which may have an inboard end 14 and an outboard end 16. The inboard end 14 may have an inboard connection eye 18 for connecting to a length of fishing line which generally has a portion which is mounted on a fishing rod and reel. The outboard end 16 may have an outboard connection eye 19. Typically the leader line 12 will comprise a wire line, which is in contrast to the mono filament character of the fishing line, although the leader line could be of any suitable type of line.

The rig 10 may also include a terminal hook 20 for attaching to one end portion of the item of bait 1, and the terminal hook may be mounted on or toward the outboard end 16 of the leader line 12. In some embodiments, the terminal hook 20 may comprise a treble hook, although single or double hooks may be employed. The item of bait 1 may comprise an item of live bait, such as a bait fish suitable for attracting the type of fish sought to be caught by the rig. Illustratively, the item of bait may comprise a smelt.

The rig 10 may also include an adjustable hook 22 for attaching to an opposite end portion of the item of bait such that the item of bait is held along a portion of the leader line 12. Illustratively, the terminal hook 20 may be attached to the front or mouth end portion of the bait fish and the adjustable hook 22 may be attached to the rear or tail end of the bait fish. The adjustable hook 22 may be attached to the leader line 12 at a location between the inboard 14 and outboard 16 ends of the line 12. The position of the adjustable hook 22 on the leader line between the ends 14, 16 may be adjustable to permit adjustment of the rig to the length of the particular bait fish being employed or the position of the hooks 20, 22 on the bait fish. The adjustable hook 22 may be slidable along a length of the leader line 22 to thereby adjust the position of the hook 22. Illustratively, the adjustable hook 22 may be connected to the leader line 12 by a shrink tube 24 which encompasses a shank 26 of the adjustable hook 22 and a portion of the leader line 12 in a manner that permits a degree of resistance to sliding of the hook on the line 12. In some embodiments, the adjustable hook 22 may comprise a treble hook, although single or double hooks may also be employed.

The rig 10 may also include a buoyant float 30 for floating the connected item of bait 1 off of the bottom of the body of water. The float 30 may be connected to the leader line at a location between the terminal hook 20 and the adjustable hook 22, and the position of the float 30 on the leader line 12 may be adjustable. In some embodiments, the leader line extends through a passage formed in the float. Optionally, the manner in which the float 30 is attached to the leader line may permit some degree of temporary fixation of the position of the float with respect to the leader line. The size, shape, color and material of the float may vary, although elongated floats may work the best with an elongated bait fish.

In some embodiments of the fishing rig 10, a weight 34 may be included for moving the inboard end 14 of the leader line 12 toward the bottom of the body of water, and in some preferable cases the weight rests upon the floor such that the inboard end 14 is drawn downwardly towards the floor while the float tends to raise the outboard end (as well as the item of bait) upwardly off of the floor. The weight 34 may be connected to the leader line 12 towards the inboard end 14 of the leader line, and may be mounted on the leader line itself or on a fishing line which is connected to the inboard end of the leader line. In some implementations, the position of the weight on a fishing line is adjustable or at least variable to set the suspended position of the item of bait above the bottom of the body of water.

The fishing rig 10 may also include a swivel 36 which is mounted on the inboard end 14 of the leader line for connecting the inboard end 14, such as through the inboard connection eye 18, to the fishing line. The fishing rig may also include a fishing line 40 which is connected to the inboard end 14 of the leader line such as through the use of the swivel 36 or directly to the inboard end 14 through the inboard connection eye 18.

In use, the terminal hook 20 is attached to one end of the item of bait, such as being attached to the head of the bait fish. The float 30 is moved on the leader line 12 to a position that is adjacent to the bait fish, and preferably is moved toward terminal hook and the head of the bait fish to encourage the bait fish to rise above the bottom of the body of water in a "head up" orientation. The leader line 12 may be wrapped around the item of bait, such as the bait fish, and the adjustable hook 22 may be adjusted on the leader line such that the position of the adjustable hook 22 generally corresponds to a position adjacent to the tail end of the bait fish. The rig 10 with the bait fish 1 may then (if not already) be attached to the fishing line 40 at the inboard end 14 of the leader line. The weight 34 may be positioned on the fishing line 40 prior to attachment of the rig to the fishing line and may slide along at least a portion of the fishing line to hold the fishing line on the bottom of the body of water.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fishing rig for attaching to and positioning an item of bait off of the bottom of body of water, the rig comprising
    a leader line having an inboard end and an outboard end;
    a terminal hook for attaching to one end portion of the item of bait, the terminal hook being mounted on the leader line toward the outboard end;
    an adjustable hook for attaching to an opposite end portion of the item of bait such that the item of bait is held along a portion of the leader line, the adjustable hook being attached to the leader line between the inboard and outboard ends, a position of the adjustable hook on the leader line being adjustable; and
    a buoyant float for floating a connected item of bait off of the bottom of the body of water, the float being connected to the leader line between the terminal hook and the adjustable hook.

2. The rig of claim 1 additionally comprising a weight for moving the inboard end of the leader line toward the bottom of the body of water, the weight being connected to the leader line towards the inboard end of the leader line.

3. The rig of claim 1 wherein the weight is mounted on the leader line or on a fishing line connected to the inboard end of the leader line.

4. The rig of claim 1 wherein a position of the float on the leader wire is adjustable.

5. The rig of claim 1 additionally comprising a swivel mounted on the inboard end of the leader line for being connected to a fishing line.

6. The rig of claim 1 additionally comprising a fishing line connected to the inboard end of the leader line.

7. The rig of claim 1 additionally comprising a swivel mounted on the inboard end of the leader line for being connected to a fishing line, and a fishing line connected to the inboard end of the leader line;
wherein the fishing line is connected to the swivel connected to the inboard end.

8. The rig of claim 1 wherein the inboard end of the leader line has an inboard connection eye for connecting to a length of fishing line and the outboard end has an outboard connection eye.

9. The rig of claim 1 wherein the terminal hook is a treble hook.

10. The rig of claim 1 wherein the adjustable hook is a treble hook.

11. The rig of claim 1 wherein the adjustable hook is slidable along a length of the leader line.

12. A fishing rig for attaching to and positioning an item of bait off of the bottom of body of water, the rig comprising a leader line having an inboard end and an outboard end,
a terminal hook for attaching to one end portion of the item of bait, the terminal hook being mounted on the leader line toward the outboard end;
an adjustable hook for attaching to an opposite end portion of the item of bait such that the item of bait is held along a portion of the leader line, the adjustable hook being attached to the leader line between the inboard and outboard ends, a position of the adjustable hook on the leader line being adjustable, the adjustable hook being slidable along at least a portion of a length of the leader line;
a buoyant float for floating a connected item of bait off of the bottom of the body of water, the float being connected to the leader line between the terminal hook and the adjustable hook, a position of the float on the leader wire being adjustable;
a weight for moving the inboard end of the leader line toward the bottom of the body of water, the weight being connected to the leader line towards the inboard end of the leader line, the weight being mounted on the leader line or on a fishing line connected to the inboard end of the leader line.

13. The rig of claim 12 additionally comprising a swivel mounted on the inboard end of the leader line for being connected to a fishing line.

14. The rig of claim 12 additionally comprising a fishing line connected to the inboard end of the leader line.

15. The rig of claim 1 wherein the terminal hook is a treble hook and the adjustable hook is a treble hook.

\* \* \* \* \*